E. F. STANFIELD.
CATTLE STANCHION.
APPLICATION FILED JAN. 19, 1915.
1,158,008.
Patented Oct. 26, 1915.
2 SHEETS—SHEET 2.
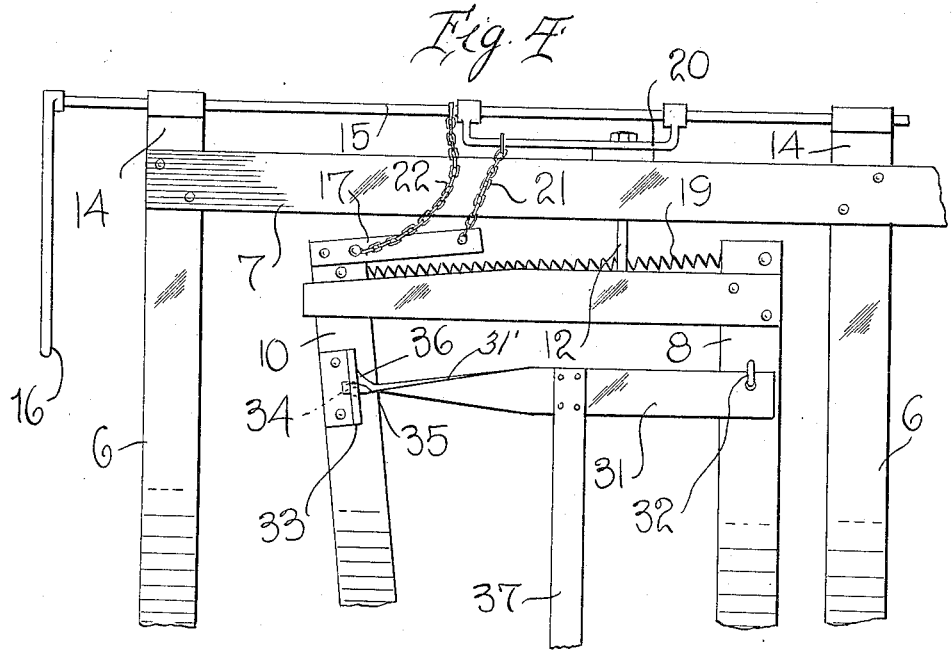
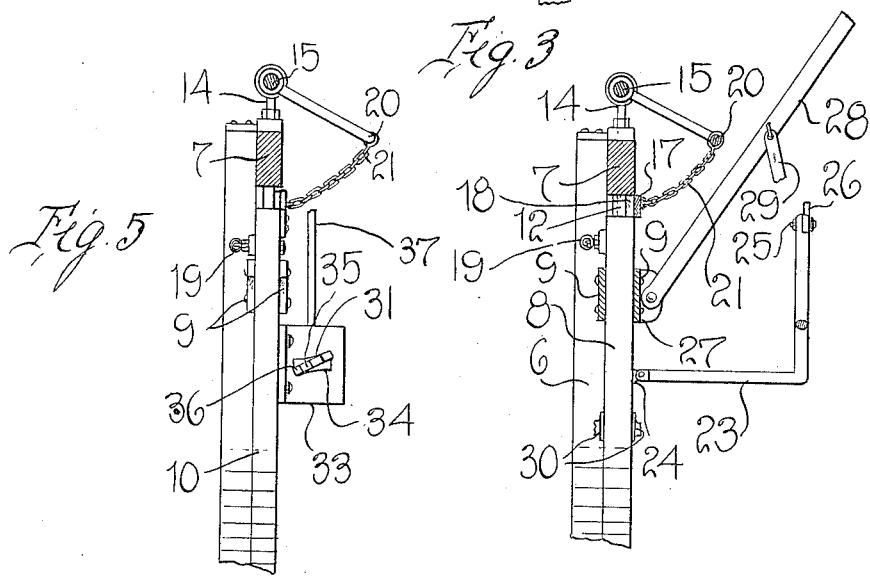
Inventor
E. F. STANFIELD
Witnesses
By Watson E. Coleman
Attorney

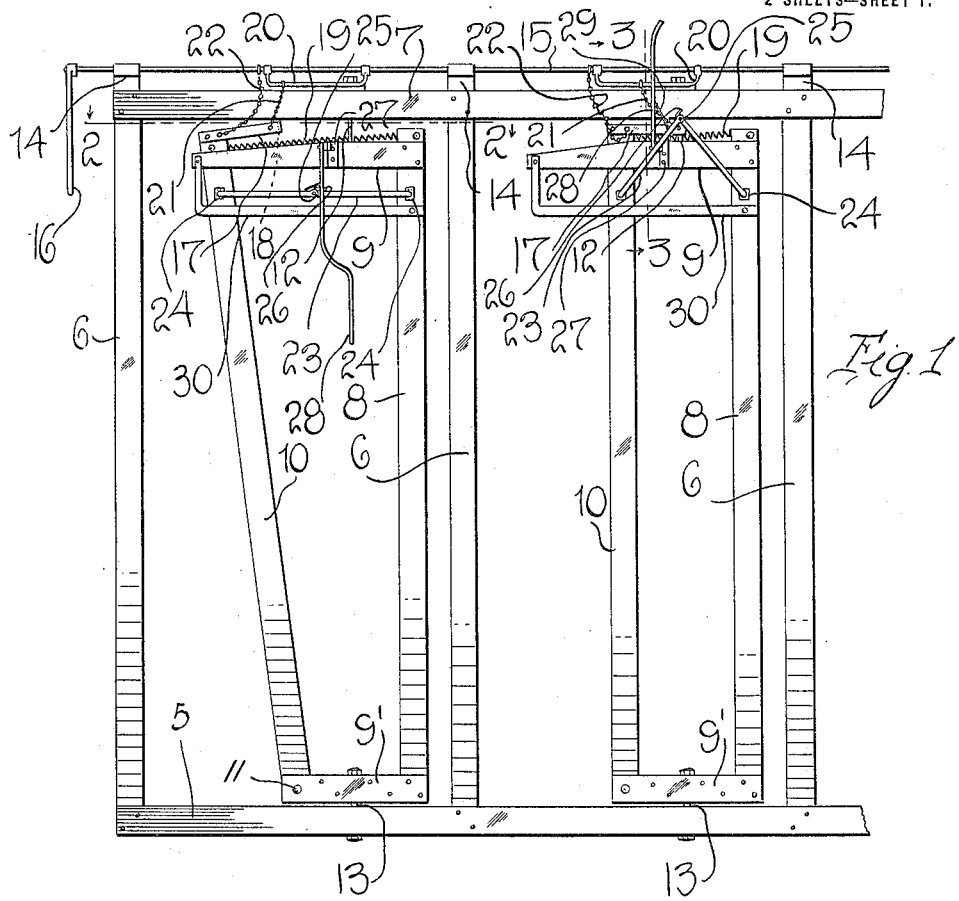
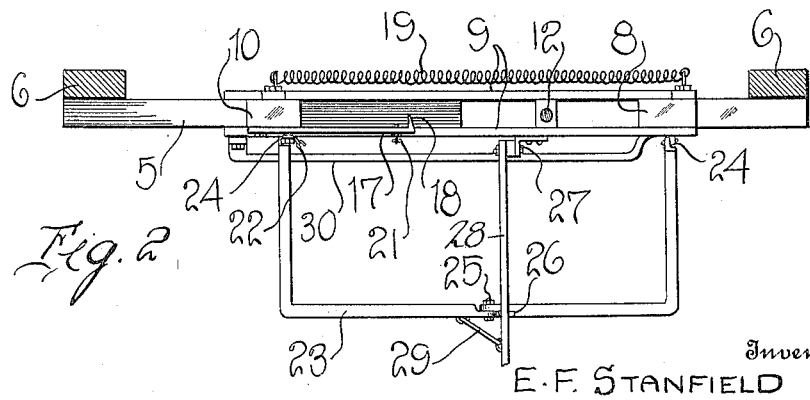

UNITED STATES PATENT OFFICE.

EDDIE F. STANFIELD, OF HOQUIAM, WASHINGTON.

CATTLE-STANCHION.

1,158,008.  Specification of Letters Patent.  Patented Oct. 26, 1915.

Application filed January 19, 1915. Serial No. 3,087.

*To all whom it may concern:*

Be it known that I, EDDIE F. STANFIELD, a citizen of the United States, residing at Hoquiam, in the county of Chehalis and State of Washington, have invented certain new and useful Improvements in Cattle-Stanchions, of which the following is a specification, reference being had to the accompanying drawings.

This invention relates to certain improvements in cattle stanchions, and its primary object is to provide means for easily and quickly opening a plurality of stanchions, and latch mechanism for each stanchion actuated through a trigger by the head of the cattle to release the movable stanchion bar so that the same is moved to its closed position and the trigger automatically raised to a non-interfering position.

It is a more specific object of the invention to provide a latch mechanism for cattle stanchions to hold the movable stanchion bar in open position, said mechanism including a jointed brace comprising sections pivotally mounted upon the stationary and movable stanchion bars, respectively, and a trigger actuated by the engagement of the animal's head therewith and connected to said brace to break the joint in the same, whereby the movable stanchion bar may move to its closed position.

The invention has for a still further object to provide improved means for locking the movable stanchion bar in closed position and manually operable means for releasing said bar and moving the same to its open position.

With the above and other objects in view, my invention consists in the novel features of construction, combination, and arrangement of parts to be hereinafter more fully described, claimed, and illustrated in the accompanying drawings, in which, Figure 1 is a side elevation showing a plurality of stanchions, one of which is closed; Fig. 2 is a section taken on the line 2—2 of Fig. 1; Fig. 3 is a section taken on the line 3—3 of Fig. 1; Fig. 4 is a view similar to Fig. 1, illustrating a slightly modified form of the latch device; and Fig. 5 is an edge view showing the movable stanchion bar of the latter construction in its closed position.

Referring in detail to the drawings, and more particularly to Figs. 1 to 3, inclusive, 5 designates the base or sill bar of the frame structure which is connected by spaced uprights 6 to the top bar or horizontal rail 7. The stanchion proper is of the usual construction and includes the vertical side bar 8; spaced upper and lower horizontal bars 9 and 9', respectively, secured at one of their ends to said side bar 8; and the movable stanchion bar 10. This latter bar is pivotally mounted at its lower end upon a bolt 11 fixed in the ends of the spaced bars 9'. It will be noted that the upper spaced horizontal bars 9 are considerably longer than the lower bars 9', and the upper end of the movable bar 10 is movably disposed between said spaced bars 9. Between the bars 9 and the bars 9', spacing blocks are arranged; and through the same, pivot bolts 12 and 13, fixed in the upper and lower frame bars 7 and 5, respectively, are disposed. The stanchions may turn or oscillate freely upon these bolts.

In suitable bearings 14 fixed upon the upper frame bar 7, a longitudinally extending rod 15 is rotatably and slidably mounted. This rod is common to all of the stanchions and on its opposite ends, is provided with suitable cranks or handles 16 whereby the same may be conveniently actuated. To the upper end of the movable stanchion bar 10 which projects above the horizontal bars 9, a spring latch plate 17 is fixed, said plate projecting inwardly from the stanchion bar and having a lug 18 formed upon its free end. When the stanchion bar is in closed position, this lug is engaged with the upper pivot bolt 12. A coil spring 19 has one of its ends connected to the movable stanchion bar and its other end fixed to the upper end of the relatively stationary bar 8. This spring normally acts to pull or draw the bar 10 to its closed position. A short rod 20 is arranged in spaced parallel relation to the rod 15, and is suitably fixed at its ends thereto. One end of a chain 21 is connected to this rod 20, the other end of said chain being attached to the free end of the latch plate 17. A second chain 22 has one of its ends connected to the upper end of the movable stanchion bar 10 and its other end attached directly to the rod 15. When it is desired to move the stanchion bars 10 of the several stanchions to their open positions, the operator first turns or rotates the rod 16 which pulls upon the several chains 21 and disengages the lugs on the several latch plates 17 from the respective pivot bolts 12. The operator now shifts the rod 15 longitudinally through its bearings, in the direction indicated by the arrow in Fig. 1, whereby the bars 10 of the stanchions are simultaneously moved to their open positions, as will be readily understood.

For the purpose of retaining the stanchion bars in their open positions, I have devised a certain amount of latch mechanism, which I shall now describe in detail.

To each of the stanchion bars 8 and 10, one end of a substantially L-shaped metal brace bar section 23 is pivotally mounted to turn in a suitable bearing lug indicated at 24. These brace bar sections extend inwardly toward each other, and are pivotally connected, as at 25. One of said bars 23 is formed with a stop lug indicated at 26, to engage upon the other brace section, whereby the downward swinging movement of said brace bars is limited. When the stanchion bars 10 are in their open positions, it will be observed that these brace bar sections 10 have their longitudinally disposed arms arranged in alinement with each other, so that they provide an effective brace between the stationary and movable stanchion bars and prevent movement of the latter to its closed position under the action of the spring 19. Upon one of the upper horizontal bars 9 of the stanchion, a suitable bearing 27 is secured, in which, one end of a trigger lever 28 is mounted for vertical swinging movement. This lever is offset intermediate of its ends so as to dispose the free extremity thereof substantially midway between the stationary and movable bars of the stanchion when the latter is in its open position. A bar connection 29 has one of its ends linked to said trigger and its other end secured in the same manner to one of the brace bar sections 23. By the bar connection 29, the trigger 28 is raised and kept in a non-interfering position while the stanchion is closed. Parallel guard rods 30 are disposed below the brace bar sections 23 and have one of their ends fixed to the stationary stanchion bar 8 and their other ends upwardly bent and secured to the ends of the horizontal bars 9. These rods 30 are provided for the purpose of obviating all possibility of contact of the horns of the cattle with the brace sections 23, whereby the pivot joint between the same might be broken when the cattle inserts its head into the stanchion.

From the above description, the manner of operation of my improved stanchion will be readily understood. Assuming that the stanchion bar 10 is in its open position, as shown in Fig. 2, it will be obvious that when the animal inserts its head between the bars 8 and 10, the lower end of the trigger 28 will be engaged thereby and forced upwardly. The bar 29, consequently, exerts an upward pull upon the jointed brace between the stationary and movable bars and breaks the joint thereof. Thus, the spring 19, by its contractile action, pulls or draws the upper end of the bar 10 inwardly toward the pivot bolt 12 and to a closed position against the neck of the animal. The lug 10 on the end of the latch spring 17, will obviously engage the pivot bolt 12 and lock the same in its closed position whereby the movement of the stanchion bar 10 away from the movable bar 8 in the efforts of the animal to release itself, is effectually prevented.

In Figs. 4 and 5 of the drawings, I have illustrated a slightly modified construction of the trigger actuated latch, wherein I provide a flat metal bar 31, one end of which is loosely engaged in an eye 32 fixed to the stationary stanchion bar. A keeper plate 33 is secured upon the upper end of the movable stanchion bar and provided with a horizontal slot 34 therein, to receive the reduced end 35 of the bar 31. Upon this reduced end of the bar 31, a lug 36 is formed. This lug, as shown in Fig. 4, is adapted to engage against the inner face of the keeper plate 33 and hold the movable stanchion bar in its open position. To the bar 31, midway between its ends, the trigger lever 37 is secured. This lever, when the stanchion bar 10 is latched in its open position, depends or extends downwardly from the bar 31 and is adapted for engagement by the head of the animal in a similar manner to the above described form of my invention. When the trigger rod is thus engaged, the bar 31 is turned upon the eye 32 and in the keeper plate 33, so as to dispose the lug 36 on said bar in alinement with the horizontal slot of the keeper. The coil spring 19 then acts to pull the stanchion bar inwardly to its closed position, the latch bar 31 sliding through the slot in the keeper. The portion of the bar 31 between the point of connection of the trigger thereto and the latch lug on the under side of said bar, is twisted, as indicated at 31'. It is, therefore, manifest that when the movable stanchion bar slides inwardly, the bar 31 is turned in the movement of the twisted portion 31' thereof through the slot 34 in the keeper plate and the trigger bar is raised to a substantially vertical non-interfering position when the stanchion is closed. The stanchion bar is moved to its open position in the manner previously described.

From the foregoing description, taken in connection with the accompanying drawings, the construction, manner of operation, and several advantages of my invention will be clearly and fully understood. It will be seen that I have devised a very simple and effective mechanism for releasing the movable bar of the stanchion for movement from its closed position, which is actuated by the animal and, therefore, does not require the manual manipulation of any mechanical parts. It will further be appreciated that I have provided a very simple and effective means whereby the movable bars of all the stanchions may be very easily and quickly moved to their open position. The invention, therefore, will be found highly serviceable and convenient in practical use. The several parts of the same being of very simple form, may be manufactured and assembled at small cost.

While I have shown and described the preferred construction and arrangement of the several elements, it will be understood that the invention is susceptible of considerable modification and I, therefore, reserve the privilege of resorting to all such legitimate modifications as may be fairly embodied within the spirit and scope of the appended claims.

Having thus fully described my invention, what I desire to claim and secure by Letters Patent is:—

1. A cattle stanchion including stationary and movable stanchion bars, a spring connected to the movable bar and normally acting to move the same to its closed position, a jointed connection between the stationary and movable stanchion bars adapted to constitute a brace between the same and maintain the movable stanchion bar in its open position against the action of said spring, and animal actuated means for breaking the joint in said connection to permit of the movement of the movable stanchion bar to its closed position.

2. A cattle stanchion including stationary and movable bars, a spring normally acting to move the movable stanchion bar to its closed position, a jointed connection between said bars adapted in one position to hold the movable bar in its open position against the action of said spring, a movable trigger member adapted to be actuated by the head of the animal when inserted between the stanchion bars, and a connection between said member and the jointed connection between the stanchion bars whereby the joint thereof is broken and the movable bar released to permit the same to move to its closed position under the action of said spring.

3. A cattle stanchion including stationary and movable stanchion bars, a spring normally acting to move the movable bar to its closed position, rods pivotally mounted upon the respective stanchion bars for vertical swinging movement, a pivot joint connecting said rods to each other, means for limiting the relative movement of said rods in one direction whereby the same constitute a brace between the stanchion bars to hold the movable bar in its open position against the action of said spring, a pivotally mounted trigger member adapted to be engaged and actuated by the head of an animal when inserted between the stanchion bars, and a connection between said trigger member and one of said rods to break the joint between the rods and permit the movable stanchion bar to move to its closed position under the action of said spring.

4. The combination with a stanchion including a stanchion proper having a movable animal holding bar, a pivot bolt upon which said stanchion is mounted, a spring normally acting to move said movable bar to its closed position, a rotatable and longitudinally movable rod, a latch member carried by the movable stanchion bar to engage said pivot bolt and hold the bar in closed position, a flexible connection between the free end of said latch member and said rod whereby, upon a turning movement of the rod, the latch member is disengaged from the pivot member, and a second flexible connection between the movable stanchion bar and said rod whereby said bar is moved to its open position upon a longitudinal sliding movement of the rod in one direction.

5. A cattle stanchion including stationary and movable stanchion bars, means urging the movable bar to closed position, means for holding the movable bar in open position and spaced from the stationary bar, and an animal actuated trigger member connected to the holding means to release the movable bar for movement to its closed position, said trigger member being elevated in such movement of the stanchion bar to a non-interfering position.

6. A cattle stanchion including stationary and movable stanchion bars, a spring normally tending to move the movable bar to its closed position, means to hold said bar in its open position, and an animal actuated trigger member connected to the holding means, said stanchion bar coöperating with said means in its movement under the action of the spring to move the holding means and dispose the trigger member in a non-interfering position.

7. A cattle stanchion including stationary and movable stanchion bars, a spring normally holding the movable bar in closed position, bodily movable means to hold the movable stanchion bar in its open position, and an animal actuated trigger member connected to the holding means to operate the same and release the movable stanchion bar for movement to its closed position, said bar, in moving to its closed position, coöperating with the holding means to bodily move the same and dispose the trigger member in a non-interfering position.

In testimony whereof I hereunto affix my signature in the presence of two witnesses.

EDDIE F. STANFIELD.

Witnesses:
JAMES P. H. CALLAHAN,
LOTTIE DE BUSH.

Copies of this patent may be obtained for five cents each, by addressing the "Commissioner of Patents, Washington, D. C."